United States Patent Office 3,631,002
Patented Dec. 28, 1971

3,631,002
POLYMERIZATION OF OLEFINS
Sydney K. Brownstein, Ottawa, Ontario, Canada, assignor to Canadian Patents and Development Limited, Ottawa, Ontario, Canada
No Drawing. Filed Dec. 26, 1968, Ser. No. 787,201
Int. Cl. C08d 3/04
U.S. Cl. 260—80.78          15 Claims

ABSTRACT OF THE DISCLOSURE

Polymerization of olefins e.g. ethylene and propylene with a cationic catalyst of carbonium ions stabilized with polyfluoro pentavalent antimony or arsenic anions, at low temperatures e.g. −20 to −90° C., and branched polymer of ethylene.

---

This invention is directed to the cationic polymerization of olefins such as ethylene and propylene at low temperature to give polymers of low to medium molecular weights. The novel catalyst is a carbonium ion stabilized by a polyfluoro pentavalent Sb or As anion.

Processes currently in use for the polymerization of olefins such as ethylene and propylene include (a) high pressure processes (about 1500 atm.) with peroxide-type catalysts and temperatures about 100–200° C., (b) Ziegler-Natta processes at low pressures and about 50–100° C. with transition metal halide plus aluminum alkyl-type heterogeneous catalysts, yielding higher density products, (c) anionic polymerizations of propylene styrene etc. with catalysts such as metal alkyls, at temperatures of about 0° to 100° C. and about atmospheric pressures yielding products generally of low molecular weight, and (d) cationic polymerizations of e.g. isobutylene, or vinyl ethers with catalysts such as $BF_3$ (Lewis acid) plus a hydroxyl compound.

The cationic polymerization of olefins probably proceeds by a carbonium ion. If this carbonium ion can be stabilized it is possible longer polymer chains could be formed than in the absence of stabilization of the growing polymer end. Unfortunately reagents which stabilize carbonium ions have been normally very reactive towards olefins and polymerization cannot be carried out effectively in their presence. A method of polymerization is now described utilizing a catalyst which effectively stabilizes the carbonium ion. By this means ethylene can be polymerized in a cationic process, which apparently has not been previously accomplished. Propylene can be polymerized to a somewhat higher molecular weight material than that previously obtainable by any cationic polymerization. The polymers formed by anionic or Ziegler-Natta type polymerizations are usually of lower or much higher molecular weights respectively, compared to the present process. Thus the present process yields polymers which should complement the range of products available by other processes.

The catalyst of the present invention is prepared by combining in solution a perfluorinated pentavalent arsenic or antimony anion with a carbonium ion. The perfluorinated pentavalent arsenic or antimony anion can be derived from arsenic pentafluoride, antimony pentafluoride and fluorine bridged combinations thereof. The fluorine bridged anions are believed to have the structure

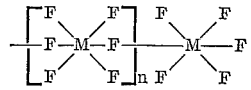

where M is arsenic or antimony and $n$ is an integer (1, 2 or more). For instance when $n$ is 2 and one M is antimony, the anion has the formula $As_2SbF_{16}^-$.

The antimony and arsenic pentafluorides will react with some halogenated solvents to yield stabilized carbonium ion species at low temperatures. Generally, alkyl mono- and dihalides with the alkyl groups (in addition to methyl) being primary or secondary can be used as solvents with "halide" being used herein to exclude iodides. Operative solvents include methylene chloride, isopropyl chloride, isopropyl bromide and n-propyl bromide. Chloroform, ethyl iodide, tertiary butyl chloride, n-hexane and benzene have been found unsuitable. Tertiary alkylhalides in some instances can be used in conjunction with a suitable solvent (see Example 1). The alkyl mono- and di-chlorides and bromides may contain up to 6 or 7 carbon atoms, with up to 4 carbons preferred.

The fluorine bridged anions can be prepared by reacting a suitable salt of hexafluoro-antimonate or -arsenate with $AsF_5$ or $SbF_5$ to form the salt of a fluorine bridged perfluorinated anion, these salts being stable in solution at low temperature. If desired an alkyl chloride or bromide more reactive than the solvent with the fluorine bridged anion can be added to form the stabilized carbonium ion. It should be noted that the Ag salts of fluorine bridged anions react readily with tertiary alkyl halides—whereas $SbF_5$ and $AsF_5$ do not. The stabilized carbonium ion should be formed below about −20° C. to have an appreciable lifetime and be capable of adding to the olefin before decomposing.

The polymerization is carried out at low temperatures of about −20 to −90° C. by contacting olefin with the catalyst solution. The pressure is usually near atmospheric for convenience but higher pressures can be used. A suitable range may be from 0.5 to 10 atmospheres. The polymerization occurs rapidly when olefin is contacted with catalyst solution. The polymer is removed from the solution when the desired molecular weight is achieved or the monomer or catalyst is exhausted. The process can be made continuous by appropriate additions of catalyst solutions and monomer, and removal of polymer and spent catalyst.

Olefins which may be used include ethylene, propylene, butylene and mixtures thereof. Copolymerizations may be carried out by feeding mixtures of monomers in the desired ratio. Copolymers of ethylene and propylene have been prepared, and isobutylene-butadiene copolymers are of considerable interest. Rather low molecular weight polymers have been prepared in the examples but it is believed that higher molecular weights can be obtained by using higher pressures and/or lower temperatures. The process should allow better control of chain length (compared to many prior processes), and give a narrow molecular weight distribution, by adjustment of monomer concentration, temperature and pressure. The ethylene and propylene homopolymers produced are predominantly branched chains. The lower molecular weight polymers are particularly useful as greases, waxes and lubricants, and in coating compositions. The polymers may be foamed, cross-linked or thermoset for particular applications, according to known techniques.

The following examples are illustrative. Parts are by weight.

EXAMPLE 1

Catalyst preparation

In methylene chloride solution, silver hexafluoroantimonate (46 parts) and arsenic pentafluoride (23 parts) reacted immediately to yield $AgAsSbF_{11}$ (69 parts). At room temperature this reagent slowly reacted with the solvent, but was quite stable at $-40°$ C. Upon the introduction of an equimolar quantity of t-butyl chloride to the $AgAsSbF_{11}$ solution a rapid reaction occurred at $-40°$ C. to give a precipitate of silver chloride and $(CH_3)_3C^+AsSbF_{11}^-$. The silver chloride precipitate can be left in the catalyst solution or removed if desired. The solution was stored at $-60$ to $-70°$ C. before use.

EXAMPLE 2

A simpler preparation of a stabilized carbonium ion catalyst was carried out by adding antimony pentafluoride (1 part) to excess methylene chloride (60 parts) as solvent, at about $-40°$ C., yielding a stabilized carbonium ion species from parts of the solvent.

EXAMPLE 3

Ethylene polymerization

Gaseous ethylene was passed into the catalyst solutions of Examples 1 and 2 at a temperature of about $-75°$ C. for 10 min. at 50 cm. Hg. pressure. The temperature was achieved by cooling with solid carbon dioxide and the mixture was stirred during the polymerization. The polymer was recovered by water washing the reaction mixture to destroy the catalyst, and evaporating solvent. With both catalysts the polymers were very viscous yellow oils (room temperature) with molecular weights in the range 560 to 760 for the Example 1 catalyst and 400 to 470 for the Example 2 catalyst. Molecular weight varied with polymerization temperature in the above M.W. ranges, the M.W. increasing with decreasing temperature.

It was evident from proton magnetic resonance spectrums of the samples that the polymers were highly branched and intermediate in structure between polypropylene and poly (butene-2) rather than of normal polyethylene structure. Thus polypropylene of structure

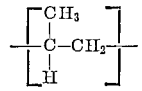

has a ratio of branched (methyl) groups to repeating chain ethylene groups of 1:1; poly (butene-2) of structure

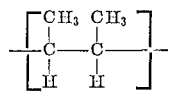

has a similar ratio of 2:1, while the ethylene polymer of the present invention has a value about 1.5:1 for this ratio. This ratio is higher than for usual polyethylenes.

EXAMPLE 4

To 8.8 parts of antimony pentafluoride in 215 parts of isopropyl chloride at $-70°$ C., ethylene was added at 60 cm. Hg pressure. After absorption of ethylene had ceased benzene was added to the reaction mixture. The reaction mixture was then washed with hydrochloric acid, then water and the organic layer dried over calcium chloride lumps. All volatile material was removed under vacuum to yield 10.5 parts of polymer.

Similar procedures were employed with 1- and 2-bromo propane (instead of isopropyl chloride) except that reaction temperatures of $-50°$ C. were employed with good yields of polymer obtained.

EXAMPLE 5

To 1.7 parts of arsenic pentafluoride in 215 parts of isopropyl chloride at $-45°$ C., ethylene was added at 60 cm. Hg pressure. The reaction mixture was worked up as previously described to yield 6.8 parts of polymer.

EXAMPLE 6

Propylene polymerization

Gaseous propylene was passed into the catalyst solutions of Examples 1 and 2 at about $-40°$ C. for 10 min. at 50 cm. Hg pressure. The mixtures were stirred and polymer formed as suspended particles in each case. The polymers were viscous yellow oils at room temperature in each instance with molecular weights in the range 850 to 1570 with the Example 1 catalyst, and about 1000 with the Example 2 catalyst. With the Example 2 catalyst the yield was 10 parts polypropylene per part of $SbF_5$. Proton magnetic resonance spectra indicated a molecular structure of the polypropylene type.

I claim:

1. A process for polymerizing olefins comprising contacting the olefin at temperatures from about $-20$ to $-90°$ C. with a solution containing carbonium ions stabilized with polyfluoro pentavalent antimony or arsenic anions, the carbonium ions being derived from alkyl groups containing up to 7 carbon atoms.

2. The process of claim 1 wherein the olefin is selected from ethylene, propylene, butene-2 and mixtures thereof.

3. The process of claim 1 wherein the carbonium ion is derived from the solvent, the solvent being selected from alkyl mono- and di-halides with the alkyl groups being primary or secondary and containing up to 7 carbon atoms.

4. The process of claim 1 wherein the solvent is selected from the group consisting of methylene chloride, isopropyl chloride, isopropyl bromide and n-propyl bromide.

5. The process of claim 1 wherein the temperature is about $-40$ to $-75°$ C.

6. The process of claim 1 wherein the pressure ranges from about 0.5 to about 10 atmospheres.

7. The process of claim 3 wherein arsenic or antimony pentafluoride is reacted with the solvent, forming the stabilized carbonium ions.

8. The process of claim 4 wherein arsenic or antimony pentafluoride is reacted with the solvent, forming the stabilized carbonium ions.

9. The process of claim 1 wherein the polyfluoro anions have fluorine bridges between a plurality of arsenic or antimony atoms.

10. The process of claim 9 wherein the fluorine bridged anion is stabilizing a carbonium ion from a tertiaryl alkyl halide.

11. A catalyst composition for the polymerization of olefins comprising a solution of carbonium ions stabilized with polyfluoro pentavalent antimony or arsenic anions, the carbonium ions being derived from alkyl groups containing up to 7 carbon atoms.

12. The catalyst of claim 11 wherein the solvent is selected from alkyl mono- and di-halides with the alkyl groups being primary or secondary and containing up to 7 carbon atoms.

13. The catalyst of claim 11 wherein the solvent is selected from metyhlene chloride, isopropyl chloride, isopropyl bromide and n-propyl bromide and containing up to 7 carbon atoms.

14. The catalyst of claim 11 wherein the polyfluoro anions are from antimony penatfluoride, arsenic pentafluoride and fluorine bridged combinations thereof.

15. A homopolymer of ethylene of a molecular weight under about 1570 having a branched molecular structure intermediate beetwen polypropylene

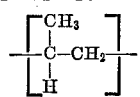

and poly (butene-2)

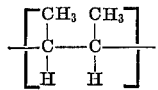

References Cited

UNITED STATES PATENTS

| | | | |
|---|---|---|---|
| 2,401,933 | 6/1946 | Hersberger | 260—683.15 |
| 2,407,181 | 9/1946 | Scott | 200—2 |
| 3,326,995 | 6/1967 | Wang | 260—668 |
| 3,449,267 | 6/1969 | May | 260—2 |

OTHER REFERENCES

Chemical Abstracts, vol. 67, 53421c.
Stable Carbonium Ions XXXIV, 1967.

JOSEPH L. SCHOFER, Primary Examiner

R. S. BENJAMIN, Assistant Examiner

U.S. Cl. X.R.

252—59, 429 R; 260—85.3 R, 88.2 R, 93.7, 94 B, 94.9 R